US008856413B2

(12) United States Patent
Schultz

(10) Patent No.: US 8,856,413 B2
(45) Date of Patent: Oct. 7, 2014

(54) DEVICE AND METHOD FOR ADDRESSING A SLAVE UNIT

(75) Inventor: Karl-Heinz Schultz, Forchtenberg-Wohlmuthausen (DE)

(73) Assignee: Ziehl-Abegg AG, Kunzelsau (DE)

( * ) Notice: Subject to any disclaimer, the term of this patent is extended or adjusted under 35 U.S.C. 154(b) by 217 days.

(21) Appl. No.: 13/387,366

(22) PCT Filed: Jul. 22, 2010

(86) PCT No.: PCT/EP2010/004508
§ 371 (c)(1),
(2), (4) Date: May 14, 2012

(87) PCT Pub. No.: WO2011/012262
PCT Pub. Date: Feb. 3, 2011

(65) Prior Publication Data
US 2012/0221755 A1    Aug. 30, 2012

(30) Foreign Application Priority Data

Jul. 27, 2009    (EP) .................................... 09009681

(51) Int. Cl.
| | | |
|---|---|---|
| *G06F 13/00* | (2006.01) | |
| *G06F 3/00* | (2006.01) | |
| *G05B 19/418* | (2006.01) | |
| *H04L 29/12* | (2006.01) | |
| *G06F 13/42* | (2006.01) | |
| *H04L 12/403* | (2006.01) | |

(52) U.S. Cl.
CPC ...... *G05B 19/4185* (2013.01); *H04L 29/12254* (2013.01); *H04L 61/2038* (2013.01); *G06F 13/4252* (2013.01); *H04L 12/403* (2013.01)
USPC ................................ 710/104; 710/9; 710/110

(58) Field of Classification Search
USPC .............................................. 710/110, 9, 104
See application file for complete search history.

(56) References Cited

U.S. PATENT DOCUMENTS

| 8,010,714 B2 * | 8/2011 | Simon ............................... 710/9 |
| 2007/0294443 A1 * | 12/2007 | Berenbaum et al. .......... 710/104 |
| 2010/0274945 A1 * | 10/2010 | Westrick et al. ............... 710/316 |

FOREIGN PATENT DOCUMENTS

| DE | 44 28 502 A1 | 2/1996 |
| DE | 44 04 962 C2 | 12/1999 |

(Continued)

OTHER PUBLICATIONS

PCT Notification of Transmittal of Translation of the International Preliminary Report on Patentability (Chapter I or Chapter II) for PCT Counterpart Application No. PCT/EP2010/004508, 10 pages, (Feb. 16, 2012).

European Search Report and Written Opinion for European Counterpart Patent Application No. 09009681.9-2206, 9 pgs., (Jan. 27, 2010).

PCT International Search Report and Written Opinion of the International Searching Authority for PCT Counterpart Application No. PCT/EP2010/004508, 15 pgs., (Dec. 10, 2010).

(Continued)

*Primary Examiner* — Nimesh G Patel
(74) *Attorney, Agent, or Firm* — Blakely, Sokoloff, Taylor & Zafman LLP

(57) ABSTRACT

The invention relates to a dynamically addressable slave unit, comprising a bus interface, an enable circuit having a switch and two control ports which are connected via the enable circuit. The enable circuit only releases the slave unit for assigning an address by an address signal provided at the bus interface when a control signal is provided at one of the control ports and when the switch of the release signal is open. Otherwise, the enable circuit locks the slave unit for the assigning of an address. The switch locks depending on whether a switching signal is provided at the bust interface directed to the address assigned to the slave unit. The invention further relates to a master unit for use with one or more dynamically addressable slave units, to slave units according to the invention, and to a method for dynamically addressing slave units according to the invention.

14 Claims, 5 Drawing Sheets

(56) References Cited

FOREIGN PATENT DOCUMENTS

| DE | 199 35 192 A1 | 2/2001 |
| DE | 102 33 978 A1 | 2/2004 |
| DE | 103 36 301 A1 | 3/2005 |
| DE | 10 2005 014 124 A1 | 9/2006 |
| DE | 10 2006 029 997 A1 | 1/2008 |
| EP | 1 072 980 A2 | 1/2001 |
| EP | 1 320 222 A1 | 6/2003 |

OTHER PUBLICATIONS

M+W Group, "Filter Fan Unit Systems Cleanroom Products." (Jun. 6, 2012), 12 pages.

Ebm-papst Mulfingen GmbH & Co. KG, "FFUs For Clean Rooms, The Standard of Perfection in Cleanliness," http://www.ebmpapst.com/en/overview-industries/ventilation_air-conditioning_refrigeration-technology/ffu_clean-rooms/ffu_for_clean_rooms.html, (Apr. 29, 2012) 1 page.

* cited by examiner

DEVICE AND METHOD FOR ADDRESSING A SLAVE UNIT

CROSS-REFERENCE TO RELATED APPLICATIONS

This patent application is a U.S. National Phase application under 35 U.S.C. §371 of International Application No. PCT/EP2010/004508, filed Jul. 22, 2010, entitled DEVICE AND METHOD FOR ADDRESSING A SLAVE UNIT, which claims priority to European patent application number 09009681.9, filed Jul. 27, 2009.

FIELD OF THE INVENTION

The invention relates to a dynamically addressable slave unit, a master unit for use with one or more dynamically addressable slave units, and a method for dynamically addressing slave units.

BACKGROUND OF THE INVENTION

Various types of buses have been known from prior art for a long time. The present invention relates in particular to master-slave bus systems.

In many master-slave bus systems, the slave units of the system can be individually identified and addressed. A master unit is thus for example able to operate through a certain slave unit a component which is controlled by this slave unit, or to assign received messages to a specific slave unit—and thus also to a specific system component. In order to ensure such a functionality, the slave unit must have on the one hand a unique address; and on the other hand, this unique address and the assignment of the slave unit to a system component or its position in the bus system of the master unit must be known.

This is conventionally achieved for example with a bus addressing or orientation phase which is performed during the initializing of a bus system. During this phase, system addresses are assigned for example in a specific sequence to the slave units, or the master unit is given the opportunity to query sequentially stored device identifiers of individual slave units at different positions. For example, an address assignment to the slave units is performed manually, wherein the slaves which are present in a defined order of succession are manually connected to the bus system individually one after another, or they are released for addressing individually by means of a manually operated switch: Since only one defined, manually selectable slave unit is connected to the bus line or released for addressing, the master unit can by issuing one broadcast command—which is in fact directed to all slave units depending on the bus system—assign a unique address to this individual slave unit. Due to this defined sequence in which the slave units are addressed, the master unit knows after the assignment of the address also the relative position of the individual units in the system.

Similar manual processes are not only time consuming and tedious, but they are also error-prone because a human user must be necessarily involved.

An automated—and therefore faster—addressing system is proposed in DE 103 36 301 A1. The addressing procedure is suitable for a master-slave bus system which is provided with a bus line having a beginning and end that is connected with the master unit. In addition, the bus line is continuously looped through the slave units. Each slave unit is provided with a switch for interrupting the bus line. In order to initialize the addressing procedure, an address assignment signal is provided at one clock input, which induces all slave units to interrupt the bus line and to assume the shift register state. The master unit then transfers sequentially the addresses to be assigned to the first slave unit; the first slave unit then shifts the addresses again one after another to the successive slave units, etc. When the first address arrives in this manner to the master unit, the master unit inputs an address acceptance signal at the clock input, after which all slave unit accept their current addresses and their switches are closed.

With this method, the bus line is interrupted during the course of the address assignment process, so that the master unit must address the slave units through one clock input.

In addition, the procedure can be used only for systems which are provided with a circular bus line and which also enable communication from one slave to another slave.

Another automatic addressing procedure is indicated in DE 199 35 192 A1. This procedure is in particular suitable for master-slave bus systems in which the slave units are provided with a unique device identifier that is preset at the factory. During the initialization of the bus system, a static activation signal is provided from a master unit through the slave units which are looped through the address line. The signal will reach only the first slave unit, which is then set to an "activated state" in which addressing is possible. After that the master sends a subscriber address for the activated slave unit and in response to this, the slave unit will send its device identifier to the master. If the identifier is identical to the expected identifier, the slave unit accepts the address. An internal slave logical unit than switches the activation signal through to the address line output of the slave unit, so that the activation signal will reach the next slave. An addressed slave is then no longer accessible for address data.

This solution is suitable for a bus system which had unidirectional lines and slave units provided with factory-preset IDs or device identifiers. After the initialization of the system, addressing is no longer possible.

EP 1 320 222 A1 relates to a bus system which has several master and slave units in which a bus line is looped through the system. A switch in the modules can interrupt the bus line. An addressing procedure can be performed prior to the start of a normal operation, so that the switches are closed sequentially and addresses are assigned to the associated slaves.

Similar procedures are also described in DE 44, 28 502 A1, DE 102 33 978 A1, DE 44 04 962 C2, DE 10 2005 0014 A1 and DE 10 2006 029 997 A1.

SUMMARY OF THE INVENTION

Against this background, the objective of the present invention is to provide a flexible, easy and quickly addressable slave unit, as well as master units which can be used with one or several slave units according to the invention. Another objective of the invention is to provide a flexible, simple and quick procedure for addressing slave units according to the invention which can be used with a plurality of bus systems.

The invention solves this problem with a slave unit according to claim 1, a master unit according to claim 8, and a procedure according to claim 14. The dependent claims and the description below provide advantageous embodiments of the invention.

The slave unit according to the invention is essentially based on a conventional slave unit, and a master unit according to the invention is essentially based on a conventional base unit, so that the units are additionally equipped with the characteristics described below which enable the dynamic addressing procedure according to the invention.

A slave unit comprises in accordance with the invention one or several bus interfaces—which can be also adjusted depending on the bus system that is used—through which one or several bus lines of a master-slave system can be connected. At the same time, the manner in which the type of the master-slave bus system is employed in principle makes no difference with respect to the design of the slave or master unit according to the invention. The invention is equally suitable for example for bus systems having one directional or bidirectional bus lines, or for circular or non-circular bus lines, and for any communication protocols.

In addition to the bus interfaces, the slave unit according to the invention is equipped with two control ports which are mutually connected within the slave unit through an enable circuit.

For example, a control line can be looped through the slave unit via the control ports. In some embodiments, the control line is designed as an additional conductor, in this case for at least two bus lines connected to the interfaces, so that the control ports form a part of the bus interfaces.

For a selective interruption of the control line, the enable circuit is equipped with one (or several) switches, for example a relay which is opened and closed depending on the signal that is provided at the bus interfaces. In order to make it possible to receive and interpret signals provided at the bus interface, the slave unit comprises for example and appropriately matched control, for instance a microcontroller. The control usually processes only those signals applied to the bus interface which are input directly to the slave unit (but for which the slave unit still must be provided with an individual address), or as an alternative, the signals are directed to all slave units of the bus system or a group of slave units to which the slave unit belongs. When a corresponding switching signal is input at the bus interface, the control causes opening or closing of the circuit in respective embodiments.

The purpose of the enable circuit which has the described circuit arrangement is to release the slave units under specific conditions for addressing, or otherwise to lock them. If the slave unit is released for addressing, it can accept an assigned address as its own address, for example with an addressing signal which is applied to a bus interface. On the other hand, if the slave unit is in the locked state, it will not accept an address under any circumstances—it is impossible to accept an address even when a corresponding signal is applied at the bus interfaces. Specifically, the enable circuit releases the slave unit for addressing only when the control line has opened the interrupting switch and a control signal has been input at the same time at a control port.

This functionality enables a dynamic addressing of a plurality of slave units according to the invention which are connected to one bus system, wherein "passing on" of the releasing conditions is enabled from a slave unit to another slave unit, so that always only one slave unit is released once for addressing. For this purpose, for example a static signal such as DC voltage of 5 Volts is input to a control line which connects one slave unit with another unit and is looped through the slave units via the control ports. Prior to applying the signal, the master unit preferably forces al the slave units to be addressed to open their switch, for example with a corresponding broadcast signal. As an alternative—for example during a procedure to redirect addressing of certain slave units—the master unit provides an appropriate switching signal directed at these slave units at the interface, so that the control line is interrupted only in each slave unit to be addressed.

Accordingly, the applied control signal is supplied only up to the first slave unit which has an open switch. Since the enable switch determines the presence of the control signal on one of its control ports with an opened switch, the slave unit is released for addressing.

Because the control line in this first slave unit is interrupted by the first opened switch, the control signal will not reach at this point in time the slave units following after the first slave units. Only the first slave unit is available in the released state. A master unit can thus for example from this point accept the unit addressing of the first slave unit, so that a broadcast messages is input to assign a specific address to the bus: Since only the first slave unit has been released for addressing, only the first slave unit will accept the address, although the assignment is actually directed at all slave units. When this is required, the master unit can confirm whether the address was accepted correctly when it sends a query message to the slave unit which just accepted the address and then awaits a response. The master unit then inputs to the slave unit with the newly assign address the instruction to close its switch, so that a control signal will be switched through to the following slave unit. The conditions for releasing are therefore no longer fulfilled for the first slave unit because it is again in the locked state. The master unit can now repeat again the addressing procedure for the next slave units, etc. . . . The addressing procedure is ended when the control signal applied to the control line is no longer present. This is triggered when all slave units were addressed, or when all slave units with addresses that were to be redirected were redirected—for example during addressing redirecting procedure.

During a similar addressing procedure, the master unit stores, for example in a suitable storage unit, information about which slave units with which addresses are connected in which order to the bus system.

The procedure described above is simple and it saves time because no manual operations need to be performed. In addition, it can be applied to many different bus systems, for example to bus systems which are or are not equipped with a circular line, or with or without a bus line which is looped through the slave units, and to unidirectional and bidirectional bus system. Another advantage is that the slave units can be addressed at any time and in any sequence because their switches can be addressed through the bus interfaces. Due to the locking of the slave units when the releasing conditions are not met, an accidental addressing is normally excluded.

SHORT DESCRIPTION OF DRAWINGS

The figures listed below explain the invention on the basis of exemplary embodiments, wherein.

Figure 4:
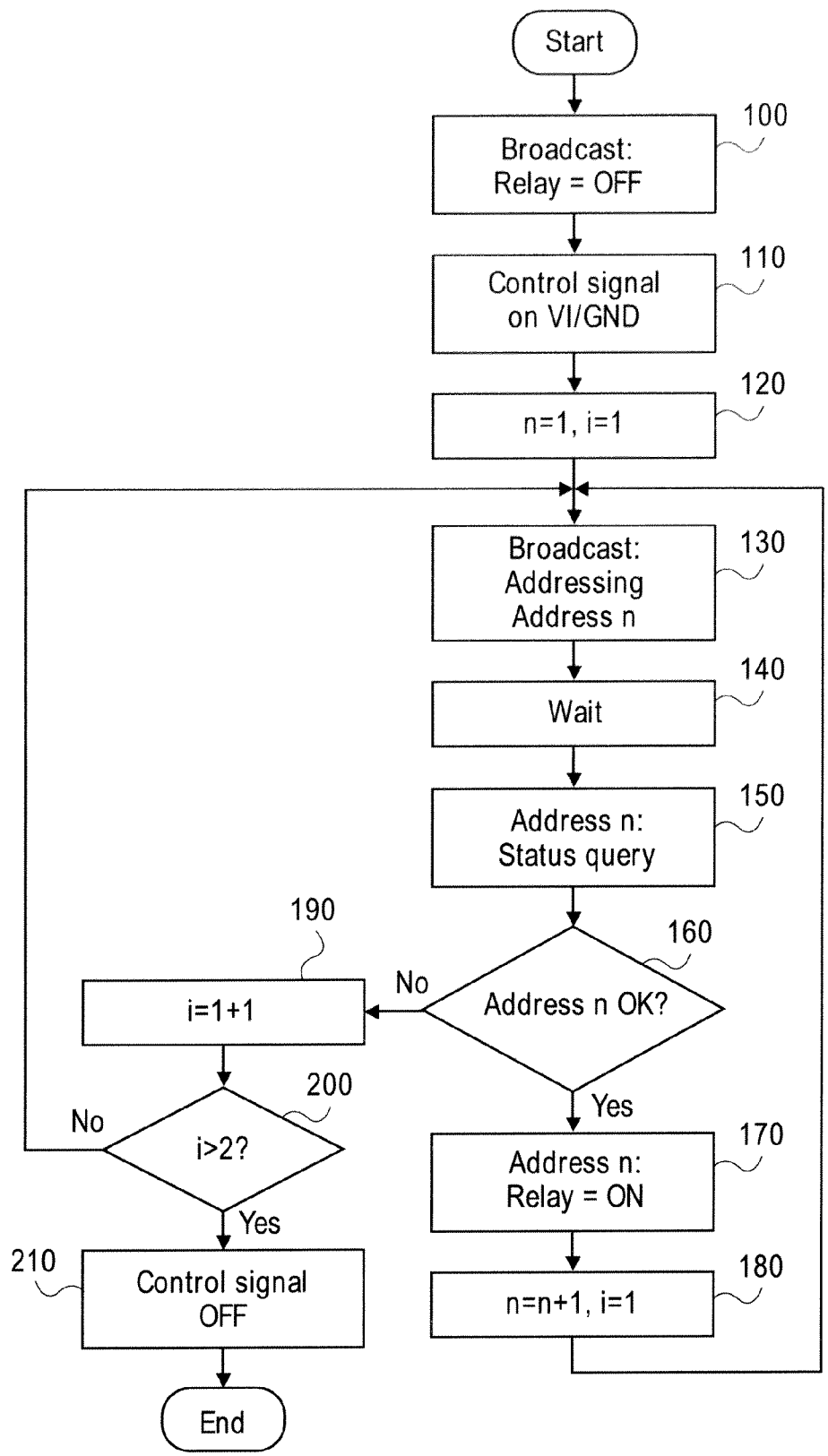
Figure 5:
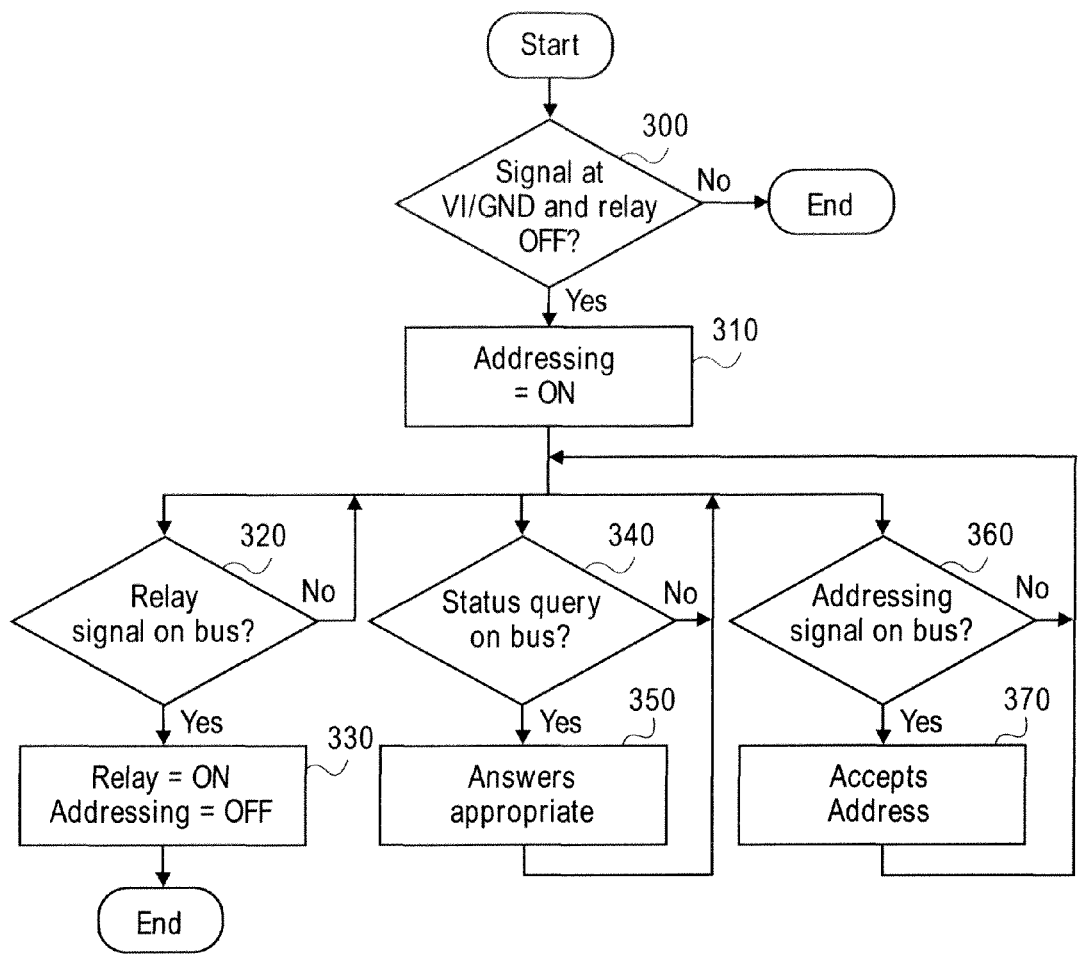

FIG. 4 indicates a flowchart illustrating the sequence in an embodiment of a procedure according to the invention from the perspective of a master unit;

FIG. 5 shows a flowchart illustrating the sequence of the embodiment of the procedure according to the invention shown in FIG. 4 from the perspective of a slave unit.

DETAILED DESCRIPTION OF THE FIGURES

Figure 1:
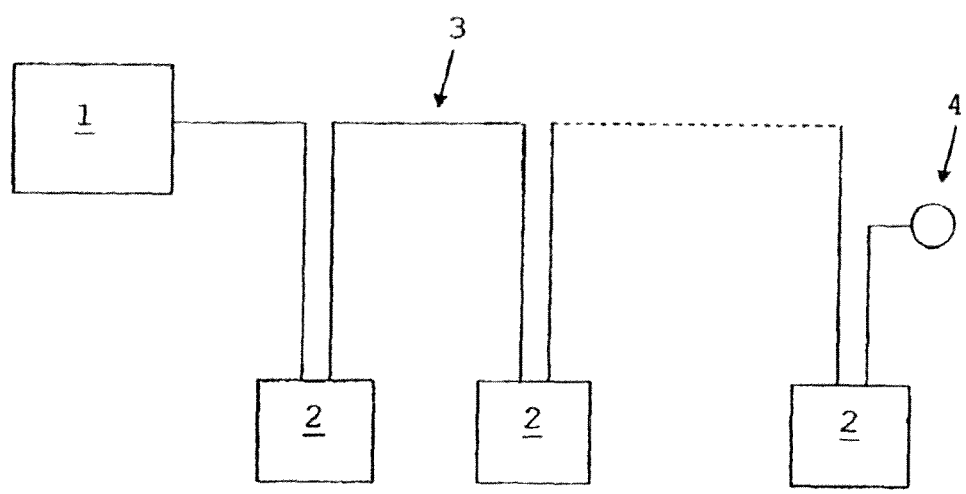
FIG. 1 shows the construction of an example of a bus system in which the slave units according to the invention can be used.

FIG. 1 shows an example of a master-slave bus system in which the slave units according to the invention are employed. The bus system comprises a master unit 1, which is connected with the beginning of a bus line 3. In the embodiment shown in the figure, a control line is also integrated in the bus line 3. As shown, the bus line is led to its first slave 2 and then looped through it. In addition, the slave unit 2 is equipped with two bus interfaces. The bus line 3 then continues to a second slave 2 through which it is looped, etc., up until the last slave 2, so that the bus line is then led through a resistor 4. The system shown here can be for example a field bus system which functions for example according to the Modbus communication protocol. The communication is conducted bidirectionally with a 2-wire field bus which is provided with a GND_COM connection. For the bus interfaces of the slave units can be used for instance RS845 interfaces. Modbus systems are used for example in intelligent houses, etc.

The invention can be used not only in the bus system shown here, but it can be also used for a plurality of other systems. So for example, the bus line 3 is not looped in some embodiments through the slave units 2, as each of the slave units 2 is connected to the bus line through individual bus interfaces. The bus lines which can be used can be both unidirectional and bidirectional. The invention is advantageously applicable also to bus systems which have several masters, and to bus systems operating according to any bus protocol. The addressing functionality according to the invention and the units required for this functionality are normally not influenced by this.

Figure 2:
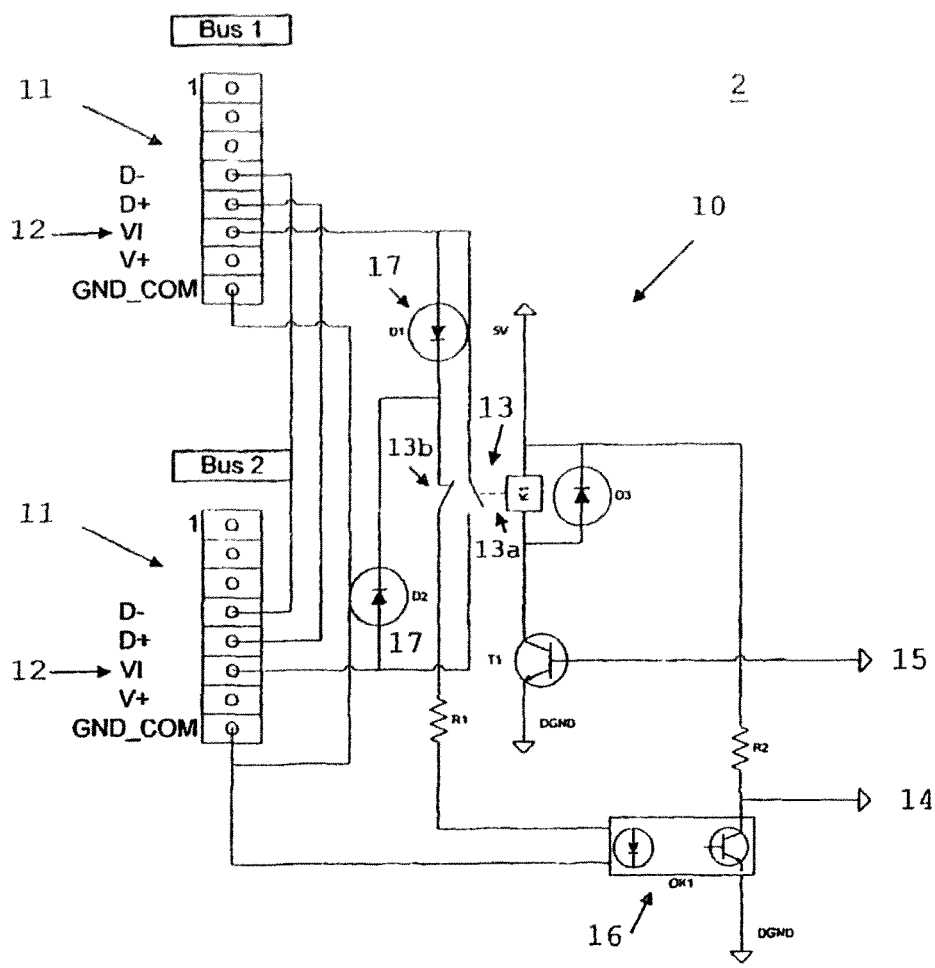
FIG. 2 shows an embodiment of an enable circuit of a slave unit according to the invention.

FIG. 2 illustrates in detail an embodiment of an enable circuit 10, which is arranged inside an embodiment of the slave unit 2 according to the invention. FIG. 2 further also shows two bus interfaces 11 of the slave unit 2. In another embodiment, the slave unit 2 is equipped only with one or no more than with two bus interfaces 11. For example, one of the bus interfaces can be used in the latter case for service functions.

The bus interfaces 11 comprises in the embodiment shown here among other items address lines D− and D+ which can be used to supply addressing signal. In addition, one line GND_COM leads to a reference potential GND_COM of the bus interface. As was indicated on the example of the address lines, the bus line is looped in the embodiment shown here through the slave unit 2, wherein one microcontroller (not shown) of the slave unit 2 shown in the illustration can provide signals from the bus interface 11.

In the embodiment shown in the illustration, the control ports 12 are realized as additional in the bus interfaces 11. A control line, not shown in the figure, which is connected with the control ports 12 or integrated with the bus interface 11, leads to a bus line, also not shown in the figure. In another embodiment, the control ports 12 are designed separately from the bus interface or interfaces of the slave unit 2. In the embodiment shown here, the control line is provided with its own reference potential; the control line is thus designed with two wires. This embodiment avoids compensation currents in the direction of the bus connections GND_COM D− D+ with the control line. Other embodiments use the reference potential of the bus line (see also FIG. 3).

The enable circuit 10 comprises in the embodiment shown here a relay 13, which is connected through a switch 13*a* with the control ports 12. With a suitable configuration of the used relay 13, a galvanic separation is created for the control ports in the embodiment shown here, which is advantageous also for safety reasons. Mutual influence between the bus line D− D+ and the control line, which is due to interfering currents, can thus be prevented.

If the switch is in the opened position as shown in the figure, the connection between the control ports 12 is interrupted. The position of the switch 13*b* of the relay depends on the position of the switch 13*a*: if the switch 13*a* is set to the closed position, the switch 13*b* is in the opened position and vice versa.

When the control line is interrupted by the switch 13*a* as shown, signal which is applied in the embodiment shown in the figure through the closed switch 13*b* and through a current limiting resistor R1 is led to the input of a photocoupler 16 and further to the reference potential GND_COM. In this case it makes no difference on which of both control ports 12 is the control signal input since both diodes 17 will allow only one current to flow in a desired direction, so that one signal can be passed from each of both control ports 12 on the photocoupler 16. As control signal can be used for example a control voltage of 5 Volts which is applied at the connection VI opposite the reference potential GND.

The control signal is applied through the output of the photocoupler 16 when the switch 13*a* is opened to an enable input 14 of the microcontroller, not shown in the figure. In addition, the output of the photocoupler in the embodiment shown in the figure is connected to a pull-up resistor R2. The photocoupler 16 provides a galvanic separation between the control ports and an evaluation part of the enable circuit formed here by the microcomputer. In the example shown here, the galvanic separation is advantageous for safety reasons or with too large potential differences. Instead of the photocoupler 16, other elements can be obviously also used here, which cause a galvanic decoupling; or it is also possible to completely omit a galvanic coupling. The employment of a current limiting resistor is also not essential for the slave unit according to the invention. Accordingly, other structural elements can be also used here. Moreover, a microcontroller is only an example of control which is used for the slave units and it should not be regarded as limiting.

As explained above, the control signal is then applied in the embodiment shown here to the enable input 14 when the release conditions "control line interrupted by open switch 13*a*" and "control signal applied at one of the control ports" are present. The presence of the control signal results in the enable state of the enable input or of the microcomputer. As a result of this, the microcontroller allows the assignment of one address to the slave unit 2 if a corresponding signal is provided at the addressing line of the bus interface. If no control signal is provided at the enable input 14, either because no control signal is applied at one of the control ports 12, or because the switch 13*a* is closed and the switch 13*b* is opened, this means that the enable conditions have not been met and the enable input or the microcontroller are in the locked state.

The microcomputer is equipped in the embodiment shown here also with an output 15 which is used to control the relay 13 that is set depending on the signal applied through the interface. For example, in the embodiment shown here, the output 15 determines the position of the switches 13*a* and 13*b*.

Figure 3:
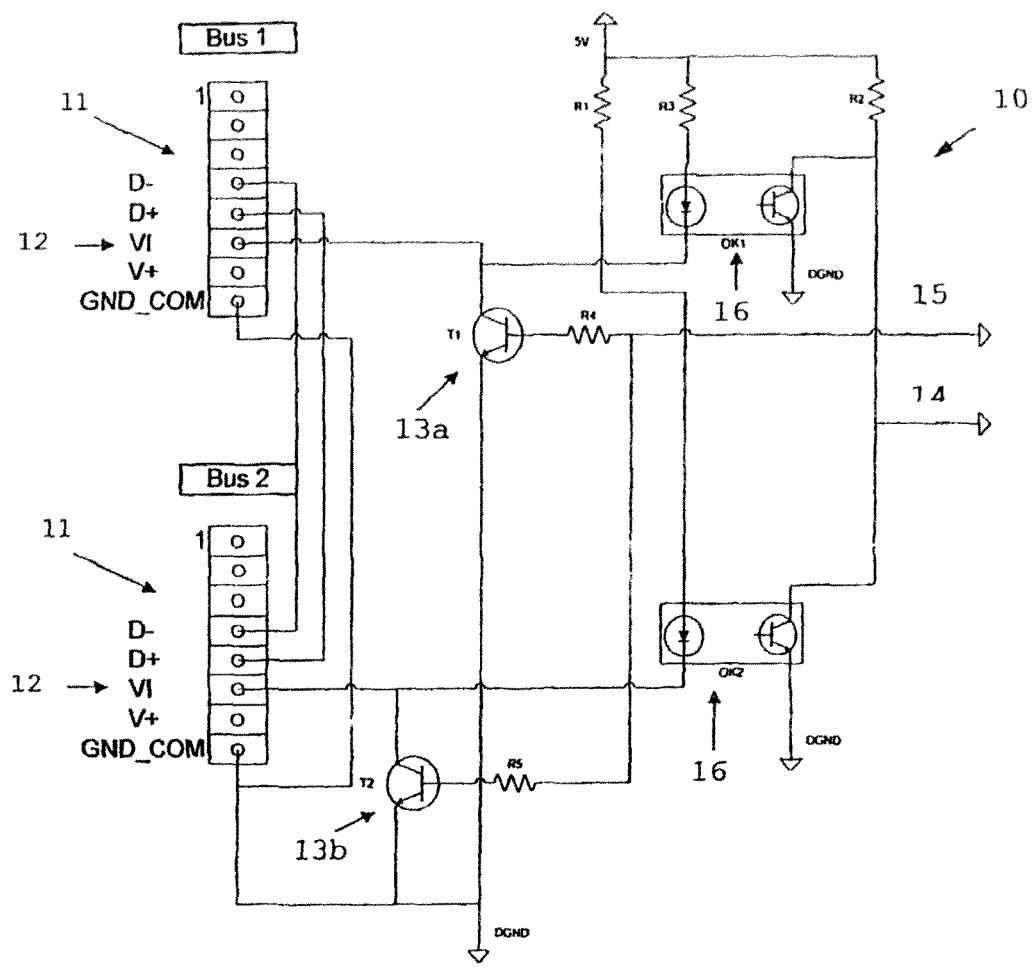
FIG. 3 shows another embodiment of an enable circuit of a slave unit according to the invention.

FIG. 3 shows another embodiment form of an enable circuit 10 which can be arranged in the inner part of an embodiment of a slave unit 2 according to the invention. The explanations above are applicable also to the elements of the enable circuit 10 which are shown in FIG. 3 and which corresponding to the elements described in FIG. 2.

The enable circuit according to FIG. 3 differs from the embodiment according to FIG. 2 mainly in that it is used for the control signal of the reference potential of the bus line. A two-conductor version of the control line is therefore not required. In addition, two transistors are employed here instead of the relay according to FIG. 2 which is used to interrupt the control line, which creates a less expensive and smaller circuit. A galvanic separation of the control ports is not provided in this embodiment.

The transistors 13a and 13b connect the control ports 12 as a switch with the reference potential DGND, which corresponds to the reference potential of the bus interface GND-COM. They are controlled through the output 15 of the microcontroller (not shown) depending on switching signal that is directed to the slave unit in such a way that both respective switches 13a and 13b are in the closed position or in the open position. If both switches 13a and 13b are opened, the connection between the control ports 12 and DGND is interrupted.

When the control line is interrupted by the switches 13a and 13b, this means that a signal applied to one of the control ports 12 in the embodiment shown here at the input of a photocoupler 16 will be conducted through the current limiting resistor R1 or R3 and then further to the (for example) 5 Volt connection. It makes no difference in this case at which of both control ports 12 is the control signal applied because both control ports 12 have an identical design, so that a signal will be forwarded from each of both control ports 12 to one of both photocouplers 16. For the control signal can be used for example a DC voltage of 5 Volts, which is applied at the connection VI opposite the reference potential GND and which can be realized for example with a simple bridge from the connection VI to the reference potential GND_COM.

The control signal is input through the output of respective photocoupler 16 when the switches 13a and 13b are open at one enable input 14 of the microcontroller, not show in the figure. In addition, the output of the photocoupler 16 in the embodiment shown here is connected to a pull-up resistor R2.

The photocouplers 16 provide a galvanic separation precisely in the same manner as in FIG. 2 between the control ports 12 and an evaluation part of the enable circuit which is formed by a microcomputer. In the example shown here, the galvanic separation is preferred for safety reasons or with large potential differences. It goes without saying that other elements can be also used instead of the photocoupler 16, as well as other elements which cause a galvanic decoupling; or it is also possible to completely omit a galvanic decoupling. The use of current limiting resistors and/or pull-up resistors is also not essential for the slave unit according to the invention. Accordingly, other elements can be also employed here. Moreover, a microcontroller is only an example of the control which is used for the slave units and it should not be regarded as limiting. The transistors 13a and 13b can be also replaced by structural elements which have a corresponding function.

As explained above, the control signal is then applied in the embodiment shown here to the enable circuit 14 when the release conditions "control line interrupted by open switch" and "control signal present on one of the control ports" are present. The application of the control signal results in the enable state of the enable input or of the microcontroller. As a result of this, the microcontroller allows the assignment of one address to the slave unit 2 if a corresponding signal is provided at the address line of the bus interface. If no control signal is applied at the enable input 14 because no control signal is present at one of the control ports, or because the switches 13a and 13b are closed, the release conditions are not fulfilled and the enabling input or the microcomputer are in the locked state.

When the slave units 2 are equipped with a corresponding enable circuit 10 of a bus system as shown in FIGS. 2 and 3 or with a corresponding enable circuit, they can be dynamically addressed quickly and in a simple manner as described above. Moreover, it is evident that the addressing function of the slave units 2 does not require any special structure of the bus interface(s) 11 and that bidirectional bus systems are also supported.

Compared to conventional units, it is only necessary to provide two control ports and an enable circuit, for example in a suitable embodiment, and additionally also an enable input and an output for controlling the switches of a control. The invention can thus be realized with a relatively small expense.

Since the position of the switches which interrupt the control line can be controlled through the bus interface, a master unit can also perform addressing or redirecting of addressing of a slave at any time.

FIG. 4 illustrates an example of an addressing operation according to one embodiment of the invention from the perspective of the master unit which is connected through a bus line with m slave units according to the invention, which are equipped with an enable circuit according to FIG. 2. The following explanation is applicable to slave units according to the invention that are equipped with different circuits (for example an enable circuit 10 according to FIG. 3).

In addition, the master unit is connected to a control line, which is looped through the connections of slave units to a number of slave units. The described addressing operation is carried out for example during the initialization of the system and all the slave units are addressed. Alternative addressing operations are related only to individual slave units, or to subgroups of slave units; in which case a suitably modified form of the illustrated addressing operation will be used.

At the beginning of the addressing operation, the master unit sends in step 100 a broadcast message to all slave units connected to the bus, which causes the slave units to switch their relays to the OFF state. This state corresponds to the state shown in FIG. 2, in which the switch 13a is open. For example, when individual slave units are being readdressed, the master unit can as an alternative cause only redirecting of relays of individual slave units. In some embodiment, this step is omitted, for example when the slave units are in any case in the relay OFF state—for example after an initializing operation.

In the next step, step 110, the master unit in this embodiment applies direct voltage between the control line VI and a reference potential GND, which is supplied due to the opened switch of the slave unit only to the first slave unit. Due to the enable switch 10, this first slave unit is with this applied control signal set to the OFF position of the relay in a state in which it is released for addressing.

After the master unit has set the control signal to the control line, the master unit in the embodiment shown here initializes the addressing operation in step 120, in which the variable n, which indicates the current slave unit to be addressed, and variable i, which is used in this embodiment to determine whether the last slave unit was addressed, is in each case set to one. After that, the master unit sends in step 130 a broadcast signal through the bus line which assigns the address 1 in an undetermined manner to all slaves. However, since only the first slave unit has been released for addressing, only this slave unit will accept the address 1, see FIG. 5.

After that, the master unit in this embodiment waits for a short period of time (step 140) so as to give enough time to the slave unit to accept the address before it starts a status query in step 150 through the bus line to the just addressed slave which has the address 1. The master unit ensures with this status query that the addressing was successful. In addition, it uses the status query here to determine whether other slave units are still to be addressed (see below). However, this step can be omitted or realized in another form later, for example after the end of the addressing operation. It is evidently also possible for the master unit to determine the number of the slave units in another manner, for example before the beginning of the addressing operation.

If the master unit received from the addressed slave unit the response through the bus line (see step 160) that the addressing was successful, it will send through the bus line to the just addressed unit having the address 1 the instruction to set its relay to the ON status, in which the switch 13a is closed and the control signal thus can be passed on to the next slave unit. The slave unit which has the address 1 will thus be set again to the locked state, while the first slave unit following after this unit will be set to the enable state with an opened switch (relay OFF state).

After that, the master unit repeats the operation for each of the next slave units (see step 180) for as long until all of the slave units to be addressed have been addressed one after another. Should it be necessary to address not only sequentially—for example during a readdressing procedure—step 180 is adjusted accordingly so that n successive numerical sequences are accepted one after another.

In the embodiment shown here it is determined that no unaddressed slave units remain when no answer has been received to the repeated status query (namely twice here, see step 200). Variable i is used for this purpose, which is incremented with each unsuccessful status query in step 190. On the other hand, if a correct answer is received to the status query, the variable i is set again to 1 (step 180). As an alternative, the master unit determines the number m of the slave units prior to the beginning of the addressing operation and stops the addressing when n=m. Instead of this, a manual intervention by the user is also possible, so that the user initiates or ends the addressing operation.

When all the slave units to be addressed have been addressed, the master unit receives the control signal from the control line (step 210). The addressing operation is thus finished.

FIG. 5 shows the described addressing operation as it refers to FIG. 4 from the perspective of a slave unit according to the invention.

In the embodiment shown here, the slave unit examines continuously in step 300 whether the conditions for the enabled state are present, which is to say whether a signal has been input to one control port, and whether the interruptable switch of its control line is in the open state. This can be observed for example with suitable software. As an alternative, a hardware switch, for example the switch shown in FIG. 2, can be used to apply voltage, for example at an enable input of an evaluation circuit when the conditions have been met. For example, the evaluation circuit can determine the presence of the conditions simply by reading the status during the enable operation. In an alternative embodiment, one slave unit examines its state only when an addressing signal is present at the bus interface.

If it is determined that all the conditions have been fulfilled, the slave unit is in the enabled or addressable state which is indicated in FIG. 5 as addressing=ON (see step 310). When an addressing signal is applied at the bus, as long as the slave unit is in this state, the slave unit or the control of the slave unit accepts the corresponding address and stores it for example in a memory (steps 360 and 370). In future, the slave unit will react not only to broadcast messages, but also to messages directed to this address until the address is overwritten. In an embodiment, the address is deleted during the deactivation of a slave unit and it must be newly assigned. Other embodiments include for example a voltage-buffered memory in which one address is stored also in case of a power failure or when the power is turned off, so that an address does not need to be newly assigned in this case. The same is applicable also to the master unit.

In addition, the slave unit also obtains—independently of the enabled state—messages on the bus and acts in accordance with the received message.

If for example a status query whether the addressing was successful is directed to the slave unit, it answers accordingly (steps 340 and 350).

Upon the receipt at the bus interface of a corresponding signal which is directed to the slave unit, the slave unit reverses the switch, which results in the enabled status and leads to a transition into the locked state indicated in FIG. 5 as addressing OFF (steps 320 and 330). The slave unit is not addressable in this state. However, the slave unit can be reset to the enabled state at any point in time, wherein both of the conditions required for enabling are fulfilled.

Slave units according to the invention, bus system provided with slave units according to the invention, as well as the addressing method according to the invention can be used for example for climate control systems, clean room applications and for ventilation control systems. The invention is particularly advantageous when it is applied to slave units of a bus system including defined fans and ventilators which are provided with control electronics that can be controlled independently of each other. However, the invention can be also used for any other applications.

What is claimed is:

1. A dynamically addressable slave unit, comprising:
a bus interface;
an enable circuit having a switch;
two control ports, which are connected through the switch of the enable circuit;
wherein the enable circuit is designed to enable the slave unit for the assignment of an address with addressing signal provided at the bus interface only when a control signal is provided at one of the control ports and when the switch of the enable circuit is opened;
wherein the enable circuit is designed to otherwise prevent the slave unit from being assigned an address;
wherein the slave unit is designed to close the switch depending on a closing signal that is provided depending on a switching signal on the bus interface and directed to the address signal assigned to the slave unit; and
wherein the enable circuit comprises an evaluation circuit having an enable input, wherein the state of the enable input depends on whether a control signal is provided at one of control ports, and whether the switch of the enable circuit is opened or closed, and wherein the evaluation as to whether the slave unit is released for or locked to addressing is determined depending on the state of the enable input.

2. The dynamically addressable slave unit according to claim 1, wherein the enable circuit comprises a switch arrangement enabling a releasing of the slave unit for the assignment of an address through the enable circuit independently, regardless of on which of both control ports the control signal is received.

3. The dynamically addressable slave unit according to claim 1, wherein the enable input is galvanically separated from the control ports.

4. The dynamically addressable slave unit according to claim 1, wherein the evaluation circuit is a microcontroller.

5. The dynamically addressable slave unit according to claim 1, wherein the enable circuit is designed in such a way that a control signal applied at one of the control ports is applied with an opened switch also at the enable input of the evaluation circuit, but not with a closed switch.

6. The dynamically addressable slave unit according to claim 1, which is equipped with two or more interfaces.

7. The dynamically addressable slave unit according to claim 6, wherein both control inputs are respectively integrated in one of the bus interfaces.

8. A master unit for use with one or more dynamically addressable slave units, wherein each dynamically addressable slave unit comprises:
   a bus interface;
   an enable circuit having a switch;
   two control ports, which are connected through the switch of the enable circuit;
   wherein the enable circuit is designed to enable the slave unit for the assignment of an address with addressing signal provided at the bus interface only when a control signal is provided at one of the control ports and when the switch of the enable circuit is opened;
   wherein the enable circuit is designed to otherwise prevent the slave unit from being assigned an address;
   wherein the slave unit is designed to close the switch depending on a closing signal that is provided depending on a switching signal on the bus interface and directed to the address signal assigned to the slave unit;
   wherein the enable circuit comprises an evaluation circuit having an enable input, wherein the state of the enable input depends on whether a control signal is provided at one of control ports, and whether the switch of the enable circuit is opened or closed, and wherein the evaluation as to whether the slave unit is released for or locked to addressing is determined depending on the state of the enable input;
   wherein the master unit comprises:
      a control port, which is designed to be connected through a control line with one of both control inputs of one of the slave units, and
      a bus interface, which is designed to be connected through a bus line with the bus interface of one of the slave units; and
   wherein the master unit is designed to assign to the slave units one address after another, so that it provides at the control input a control signal and alternately an addressing signal for assignment of an address to one of the slave units, and provides a switching signal directed to the address that is assigned at the end.

9. The master unit according to claim 8, which is designed to provide between an addressing signal and a switching signal a query signal at the bus interface, which is directed to the address that is assigned at the end.

10. The master unit according to claim 8, wherein the addressing signal is a broadcast message that is directed to all slave units of the bus system.

11. The master unit according to claim 8, wherein DC voltage is applied as the control signal until the last slave unit to be addressed has been addressed and its switch has been reversed.

12. The master unit according to claim 8, wherein the master unit ends the addressing operation if an unaddressed slave unit is not found during a search, wherein the search is performed by the master unit.

13. A method for dynamic addressing of slave units according to, wherein each dynamically addressable slave unit comprises:
   a bus interface;
   an enable circuit having a switch;
   two control ports, which are connected through the switch of the enable circuit;
   wherein the enable circuit is designed to enable the slave unit for the assignment of an address with addressing signal provided at the bus interface only when a control signal is provided at one of the control ports and when the switch of the enable circuit is opened;
   wherein the enable circuit is designed to otherwise prevent the slave unit from being assigned an address;
   wherein the slave unit is designed to close the switch depending on a closing signal that is provided depending on a switching signal on the bus interface and directed to the address signal assigned to the slave unit;
   wherein the enable circuit comprises an evaluation circuit having an enable input, wherein the state of the enable input depends on whether a control signal is provided at one of control ports, and whether the switch of the enable circuit is opened or closed, and wherein the evaluation as to whether the slave unit is released for or locked to addressing is determined depending on the state of the enable input;
   wherein the method comprises:
      providing a control signal through a master unit at one control line which is continuously looped via the respective control ports through the slave units, and
      sending an addressing signal through the master unit, which assigns an address to one of the released slave units, on one bus line that is connected with the bus interfaces of the slave units;
   wherein after the addressing signal has been sent, a switching signal is sent to an address that was assigned in a previous operation by the master unit on the bus line; and
   wherein both last operations are repeated until the last slave unit to be addressed has been addressed.

14. The method according to claim 13, comprising a query signal which is provided through the master unit on the bus line between an addressing signal and a switching signal, wherein the assignment of the address that was assigned at the end is confirmed through the query signal.

* * * * *